Figures 1, 2:
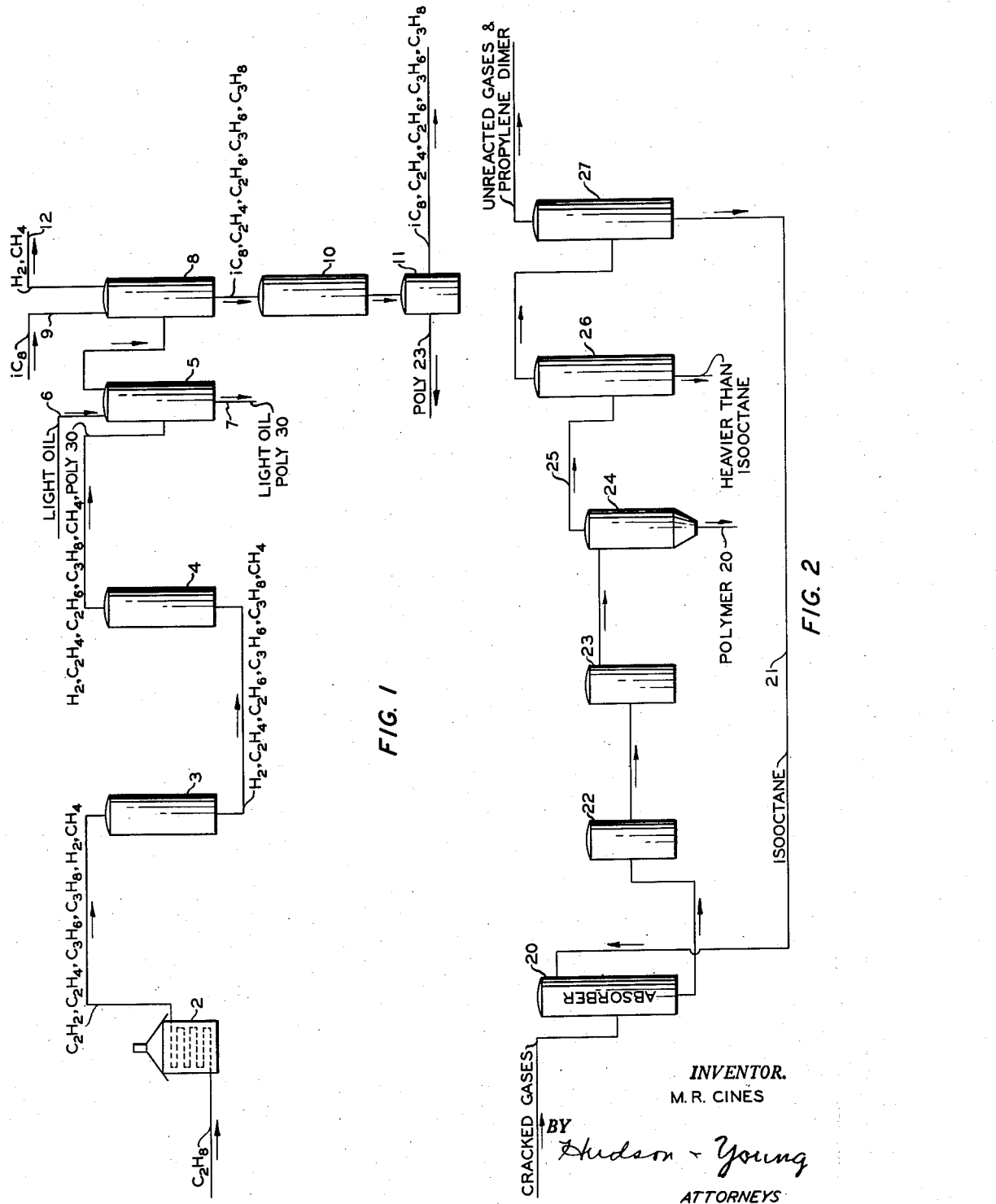

March 18, 1958 — M. R. CINES — 2,827,444
PRODUCTION OF HIGH MOLECULAR WEIGHT POLYETHYLENE
Filed July 2, 1954 — 3 Sheets-Sheet 1

INVENTOR.
M. R. CINES
BY Hudson & Young
ATTORNEYS

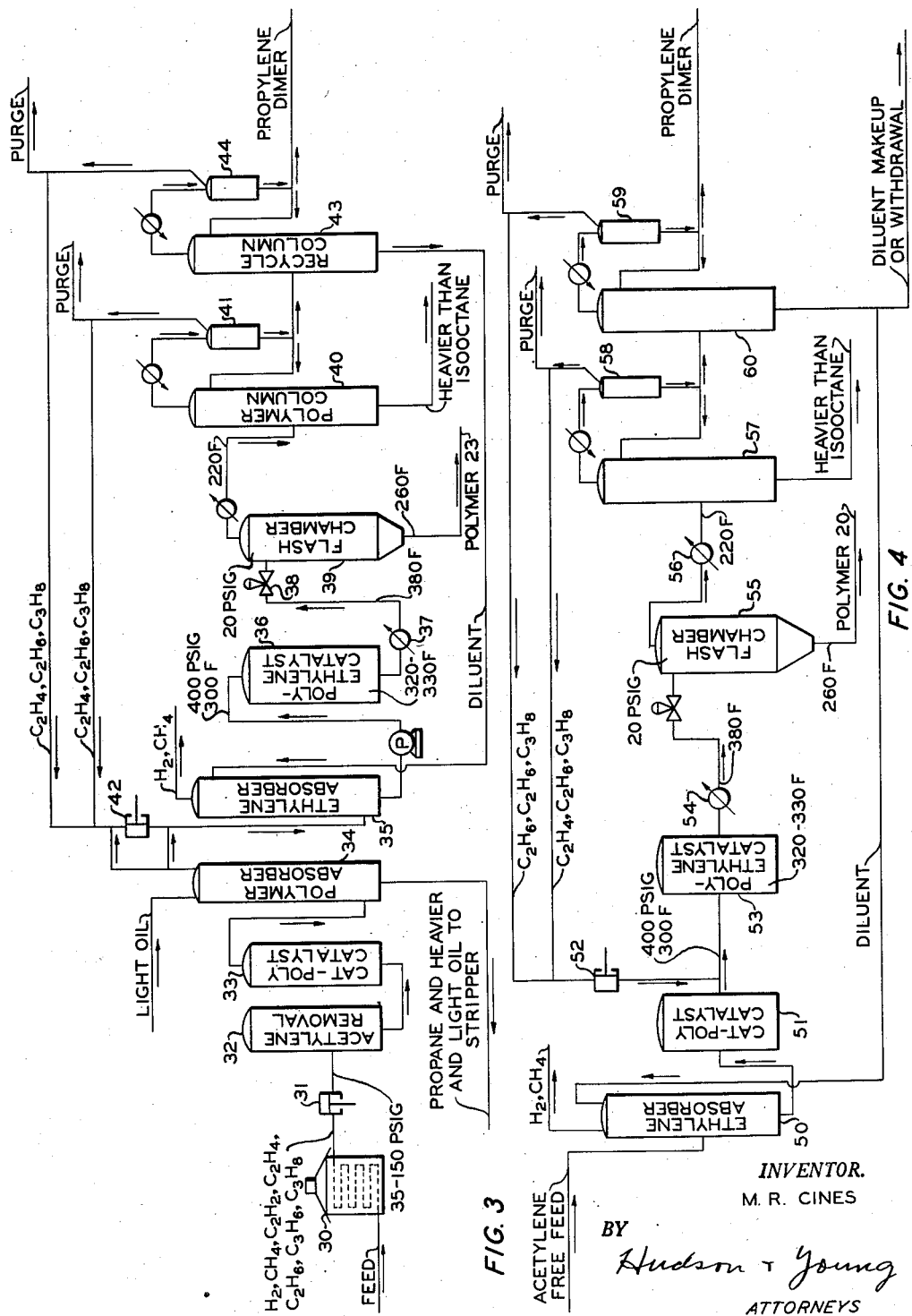

March 18, 1958 M. R. CINES 2,827,444
PRODUCTION OF HIGH MOLECULAR WEIGHT POLYETHYLENE
Filed July 2, 1954 3 Sheets-Sheet 3

INVENTOR.
M. R. CINES
BY
Hudson & Young
ATTORNEYS

United States Patent Office 2,827,444
Patented Mar. 18, 1958

2,827,444

PRODUCTION OF HIGH MOLECULAR WEIGHT POLYETHYLENE

Martin R. Cines, Bartlesville, Okla., assignor to Phillips Petroleum Company, a corporation of Delaware Application July 2, 1954, Serial No. 441,129

15 Claims. (Cl. 260—88.1)

This invention relates to the production of polyethylene. In one of its aspects the invention relates to the production of a tacky solid, or semi-solid, polyethylene employing a non-reactive solvent to selectively absorb ethylene from gases containing the same, to convey said ethylene into a polymerization zone wherein it is polymerized, and to then convey polymerized ethylene from said zone. In a further aspect, the invention relates to the absorption and concentration of ethylene in a solvent which is non-reactive under conditions forming solid polyethylene in the presence of a catalyst as herein described by contacting said gases with said solvent and then conveying said ethylene contained in said solvent, in some cases together with some propylene, to a polymerization zone wherein the formation of solid polyolefin is accomplished. In another aspect, the invention relates to the production of solid polyethylene by subjecting a non-reactive solvent containing ethylene and also containing absorbed propylene to propylene polymerizing conditions adapted to polymerize at least sufficient of said propylene so that in the ensuing ethylene polymerization, the propylene will enter only desirably into the solid product to be formed from said ethylene. In still another aspect of the invention, it relates to the production of polyethylene from a cracked hydrocarbon gas stream, containing acetylene, hydrogen and ethylene, which includes contacting said stream with a hydrogenation catalyst under conditions to hydrogenate acetylene to ethylene. In still another aspect of the invention, it relates to the feeding of a vaporous material, for example ethylene, into an absorber wherein the vaporous material is absorbed into a solvent which will remain substantially unaffected in an ensuing conversion operation in which said vaporous material is converted, dividing the solution of said vaporous material in said solvent thus obtained into at least two portions, feeding a portion to a conversion zone for conversion of the vaporous material in the solvent, passing the solvent to another conversion zone, passing the other portion of said solution to a stripper zone, therein causing the solution to yield up a substantial portion of said vaporous material and passing said vaporous material into the solvent passing to said another conversion zone.

There is at present considerable interest in solid polymers of ethylene, but in the manufacture of ethylene polymer from cracked gases, purification of the ethylene is a large part of the cost of the operation. My invention accomplishes the steps of absorption, purification, and polymerization in such a manner that the process can be operated with a minimum amount of compression and refrigeration and thus considerably cheaper and more efficiently than conventional processes. My invention primarily resides in the novel and advantageous manner in which the various steps have been combined to produce the desired result.

It has been found desirable to use a diluent, preferably isooctane, in the polymerization of ethylene to solid polymer over chromium oxide-silica-alumina catalyst.

In Serial No. 333,576, filed January 27, 1953, now abandoned, there is described and claimed a process for the polymerization of olefins, for example, ethylene, admixed with a hydrocarbon diluent inert and liquid under the conditions of the process in the presence of a composite catalyst comprising chromium oxide. Generally, the conditions and other operational details, given in Serial No. 333,576, where required, are applicable in the process of the present invention.

When the solvent of the present invention is a hydrocarbon, it preferably is a paraffin and will include at least one paraffin having from 3 to 12 carbon atoms per molecule. Any hydrocarbon diluent which is relatively inert, non-deleterious, and liquid under the reaction conditions of the process may be utilized. Diluents that have been used successfully include propane, isobutane, normal pentane, isopentane, and isooctane. The heavier diluents gave better results, probably because they are better solvents for the heavy polymer. However, very heavy diluents have the disadvantage that they are more difficult to separate from the polymer.

My invention uses a solvent, as described, as the absorbing medium in an ethylene absorber and then, in one embodiment of the invention, the absorber kettle product is fed to the catalyst without further treatment, or, as in another embodiment of the invention, a preliminary polymerization of gases other than ethylene is practiced.

In the drawings, the figures illustrate diagrammatically the two embodiments to which I have referred. Although the process is described with reference to a cracking furnace effluent containing propylene and lighter material, it should be understood that the effluent may contain minor amounts of heavier material.

In Figure 1, a propane gas is pyrolytically treated to produce an ethylene-containing gas which is hydrogenated, principally to convert acetylene to ethylene following which the gases are subjected to propylene polymerizing conditions. After removal of propylene polymers, to an extent desired, the gases are subjected, dissolved in a solvent, to ethylene polymerizing conditions in the presence of a catalyst, suitably and now preferably the catalyst which is described and referred to herein.

In Figure 2, cracked gases containing ethylene are contacted with a solvent, say isooctane, in an absorber following which propylene and then ethylene polymerizations are effected. Upon polymer removal and fractionation, the solvent is returned for further use in the absorber.

In Figure 3 is shown an embodiment of the invention in which a saturated hydrocarbon gas is cracked to produce a stream from which acetylene is removed followed by removal of propylene. The acetylene is removed by catalytic hydrogenation and the propylene is removed by catalytic polymerization. Catalytically polymerized gases are treated in an absorber by absorption contact with a light oil obtaining ethylene which is then absorbed in a hydrocarbon liquid and subjected to polymerization under conditions of polymerization to form polyethylene, following which the polymer is obtained by flashing therefrom unreacted gases and materials lighter than said polymer. Some propylene can be present in the ethylene in which event some interpolymer of ethylene and propylene will be present in the final product. The material flashed from the product is fractionated to remove all materials heavier than the said hydrocarbon liquid which hydrocarbon liquid in this instance is isooctane, which passes overhead and from which unreacted ethylene, ethane, and propylene are removed following which the isooctane is recycled to the ethylene absorber. Prior to recycle of the isooctane, propylene dimer which can be contained therein is advantageously removed therefrom.

In Figure 4 is shown an embodiment in which acetylene-free, ethylene-containing gaseous feed, is absorbed in the diluent which can be isooctane, following which any propylene which has been absorbed is polymerized in the diluent by subjecting the entire stream to polymerization conditions whereupon together with recycle ethylene, the said stream is subjected to polyethylene-forming conditions in the presence of the catalyst without prior removal of propylene polymer. The remainder of the operation is then conducted substantially as generally described for Figure 3 hereof.

Figure 5:
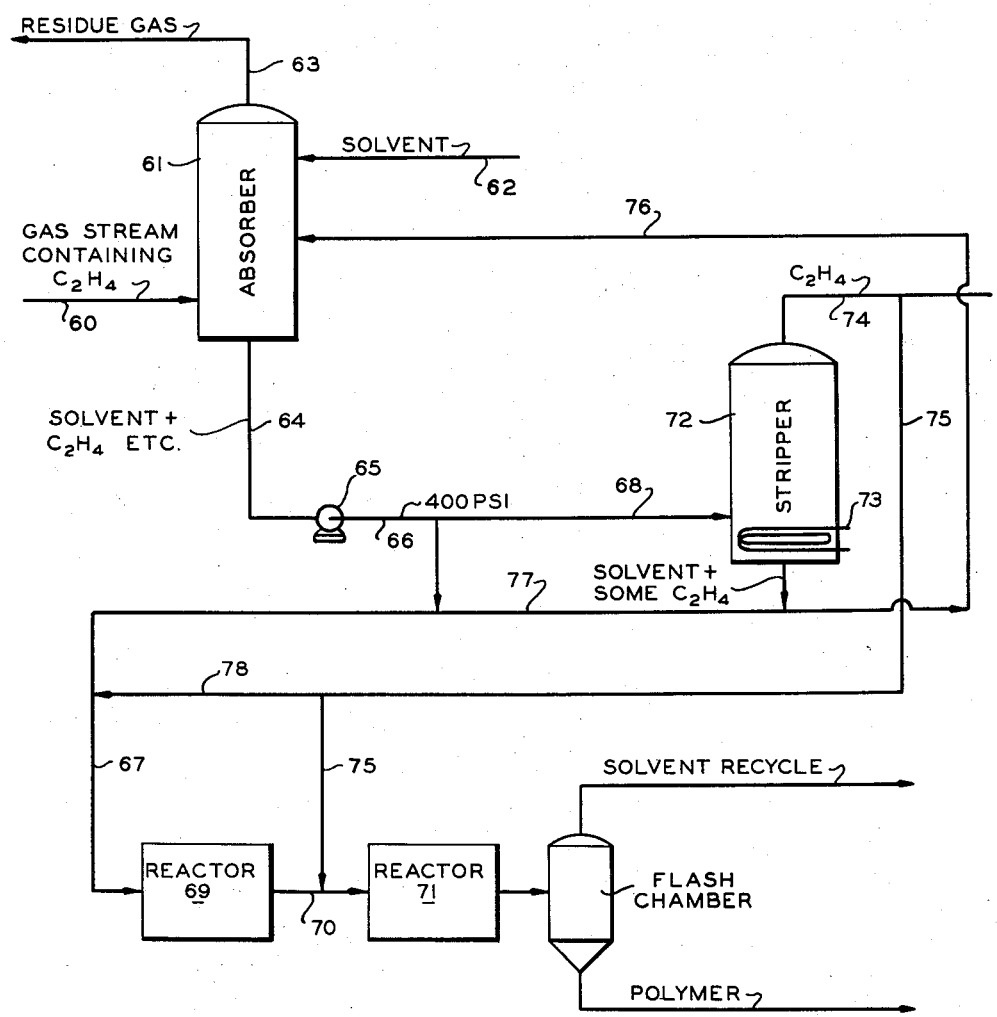

In Figure 5 is shown an embodiment of the feature of this invention according to which the solvent containing the absorbed gases is divided into at least two streams, one stream is sent to a first reactor and the other to a stripper to obtain from said stripper gases for reintroduction into said solvent at a point downsteam of the first reactor.

Each of the embodiments of the invention has distinct advantages but a feature common to all is the use of the ethylene absorbing medium as a diluent in the ethylene polymerization.

The polymer number designations used in this disclosure are numbers designating the major and minor constituents of the polymer. The individual numbers refer to the number of carbon atoms in the monomer, for instance, 2 is for ethylene and 3 is for propylene. The first number in order is the major constituent and the other is the minor, for instance, polymer 23 contains more ethylene than propylene and polymer 20 is considered to be all ethylene.

In Figure 1, propane is fed to a thermal cracking furnace 2, preferably a Selas furnace. The effluent from this cracking step is a mixture of acetylene, ethylene, propylene, hydrogen, methane, propane, and heavier material. The gaseous portion of this stream will henceforth be referred to as a cracked gas stream. This stream in the gas phase is then passed, in zone 3, over a catalyst, for example, a palladium catalyst, for the selective hydrogenation of acetylene to ethylene. This stream, still in the gas phase, is passed, in zone 4, over a propylene polymerization catalyst, such as a phosphoric acid catalyst, where the propylene is polymerized, and the ethylene is unaffected. The effluent from this polymerization step is fed to a scrubber 5 wherein a light oil introduced at 6 is used to absorb the propylene polymer which is removed at 7. The stream is then fed to the ethylene absorber 8 where the ethylene and heavier components are absorbed in the diluent isoocatane introduced at 9. The absorber kettle product which is a solution of isooctane, ethylene, ethane, propylene and propane is fed to a chromium oxide-alumina-silica catalyst in zone 10 at conditions selective for the polymerization of ethylene to solid polymer "23." This polymer, the isooctane, and unreacted gaseous hydrocarbon are separated from each other by conventional means in zone 11 and the isoctane is recycled to absorber 8. Hydrogen and methane are vented from the process at 12. When desired, the isooctane stream can be treated to remove other gases accumulated therein, for example, ethane.

Referring now to Figure 2, an essentially acetylene-free, cracked gas stream is fed to absorber 20 wherein ethylene and heavier gases are absorbed by a solvent or diluent, in this case, isooctane introduced through 21. Ordinarily, the stream will contain at most only a small amount of acetylene and any acetylene present will be polymerized along with the other olefins present. The absorber kettle product is fed in the liquid phase to a catalyst case 22 containing a phosphoric acid catalyst and conditions are maintained such that essentially all of the propylene, butylenes, etc., are polymerized and ethylene is unaffected. The effluent from this catalyst case is fed without any intermediate purification to the ethylene polymerization catalyst 230. The products of the first polymerization step are not affected in the second polymerization step and act as diluents. The effluent from the ethylene polymerization catalyst is fed to flash chamber 24 wherein essentially pure polyethylene, which is solid at room temperature (polymer "20") is removed. The components of the vapor from the flash chamber, taken overhead through conduit 25, are then separated by any desired means. One method for this separation is shown on the drawing; the overhead from flash chamber 24 is introduced into fractionator 26 through line 25; isooctane and lighter material is taken overhead from fractionator 26 and is fed to fractionator 27. The kettle product from fractionator 27 is the isooctane diluent which is recycled to the absorber. Polymer-containing compounds having twelve and more carbon atoms to the molecule are removed from the bottom of fractionator 26. Unreacted gases and propylene dimer are taken overhead from fractionator 27.

From the foregoing descriptions, it will be evident to one skilled in the art that this invention minimizes the use of expensive compression and refrigeration equipment which is usually a large part of an ethylene purification plant.

Referring now to Figure 3, there is shown the pyrolysis in a furnace 30 of a hydrocarbon gas such as ethane, propane, butane, or a mixture of two or more of these gases, butane being a preferred feed in the invention, followed by a compression by compressor 31 of the cracked effluent prior to an acetylene removal step 32, if desired, following which the gases are catalytically polymerized to polymerize propylene therein in catalytic polymerization zone 33, following which propylene and other undesired materials such as propane and heavier materials are absorbed from the stream in polymer absorber zone 34. As understood in the art, the pyrolysis of hydrocarbons results in some heavier materials which desirably are removed prior to the acetylene removal step by means not shown. The acetylene can be removed by hydrogenation over platinum, palladium, nickel sulfide, or other suitable catalyst. A process for the removal of acetylene from gases containing the same is described and claimed in copending application, Serial No. 363,400, filed June 22, 1953, by Gene Nowlin, now U. S. Patent No. 2,775,634. In said application, the removal of acetylene is accomplished employing a catalyst.

In the embodiment shown, employing nickel sulfide catalyst, the pressure during the acetylene removal will be in the neighborhood about fifty pounds per square inch absolute and the temperature will be in the range 125–350° C. (257–662° F.). Thus the furnace effluent is compressed to about 35–75 pounds per square inch gauge.

As noted elsewhere herein, a phosphoric acid-type polymerization catalyst is suited to the polymerization of propylene. Such catalyst can be employed at a temperature in the range of about 250–600° F. and, in any event, a desirable or optimum temperature for this step can be determined in the case of each catalyst according to procedures well understood by those skilled in the art, given that they have been provided with this disclosure.

In polymer absorber zone 34, the absorber medium can be a light oil which can be a miner seal oil, which is suitable in most instances, and the polymerization effluent will be fed to the absorber which operates in the range of 50–400 pounds per square inch gauge and about 125° F. and the absorber operated to obtain overhead the gases which are desirable in the ethylene absorber zone 35; polymer together with propane, and heavier materials being removed as bottoms from absorber zone 34, from which bottoms the absorber fluid can be obtained by a stripping operation as well understood in the art and which is not shown on the drawing for sake of simplicity. In the ethylene absorber, a pressure and temperature are maintained to recover about 90 percent of the ethylene from the hydrocarbon stream and, as understood by one skilled in the art, the temperature and pressure will vary depending upon the composition of the gases and other factors involved in absorption. The temperature in the ethylene absorber will be in the range of −60–+90° F. and the pressure will be in the range of 50–400 pounds per square inch gauge.

In ethylene absorber 35, the absorbing medium will be, as stated, a liquid suitable to act as diluent in the ensuing polymerization of ethylene to polyethylene and this absorber medium in this embodiment is isooctane. The ethylene in solution in the isooctane is passed to catalytic zone 36 in which a catalyst, for example, that described in above-mentioned Serial No. 333,576, can be employed. The temperature in zone 36 will be about 300° F. and the pressure will be about 400 pounds per square inch gauge with preferably about a 20–30° rise in temperature over the catalyst. The temperature can vary and a range of 225–350° F. is now preferred. In this embodiment about 2 weight percent ethylene is dissolved in the isooctane and the pressure obtained is sufficient to ensure liquid phase operation. With isooctane, the pressure can be in the range 350–400 pounds per square inch gauge. Within this range of pressure it is possible to vary the concentration of ethylene of from about 1 to 5 weight percent of the total isooctane-ethylene mixture and to sufficiently maintain the liquid phase for desirable operation.

Leaving polymerization zone 36 at a temperature of about 320° F. to 330° F., in the embodiment described, the effluent is passed through heater 37 and a pressure reduction valve 38 into a flash chamber 39 wherein flashing under reduced pressure is conducted. Normally solid but presently liquid polymer is removed from the bottom of flash chamber 39 at a temperature of about 260° F. which is obtained when flash chamber 39 is operated at about 20 pounds per square inch gauge. As noted, the polymer can contain some propylene and in the embodiment described contains propylene as polymer combined in the polyethylene. Vapor from the flash chamber, though it can be passed through a series of flashers operative in any suitable sequence which may be desired in modification of the embodiment, is passed to polymer separation zone 40 in which all material heavier than isooctane is removed as bottoms. Lighter material taken overhead from fractionator 40 is passed to a gas separator 41 from which non-condensed gas can be fed to recycle compressor 42 and from which gas separator liquid phase is passed to recycle column 43 from the bottom of which isooctane is recycled to ethylene absorber 35 to absorb additional quantities of ethylene in the operation. Recycle column 43 is operated to remove from the isooctane diluent substantially all propylene dimer which is formed in polymerization zone 36 and in the embodiment described gases containing ethylene are recovered from the propylene dimer in gas separator 44 and recycled to compressor 42. In the embodiment, column 40 can be operated at a pressure of from substantially atmospheric to about 15 pounds per square inch gauge and at a temperature to remove as bottoms the said material heavier than isooctane. Column 43 is operated substantially at atmospheric pressure.

As understood in the art from time to time a purging operation can be conducted upon the gas streams leaving gas separators 41 and 44.

Referring now to Figure 4, the operation described for Figure 2 is modified to show the recovery of gases as described in Figure 4. Thus, acetylene-free feed is contacted with isooctane in ethylene absorber 50 whereupon ethylene is absorbed together with propylene which may be present, hydrogen and methane being removed as overhead. The isooctane diluent containing ethylene and said propylene is subjected to propylene polymerizing conditions in polymerization zone 51 from which together with recycled gases fed thereinto by means of compressor 52 the effluent from zone 51 is passed directly to polyethylene-forming zone 53. The operation of heater 54, flash zone 55, and fractionating zones 57 and 58 and their respective gas separators 58 and 59 are substantially as heretofore described in connection with Figure 3. A heat exchanger 56 is employed in this embodiment to supply or remove heat from the material entering fractionator 57 in the event that the said material does not contain the proper amount of heat to accomplish the separation desired to be effected in fractionator 57. Thus, heat exchanger 56 is adapted to heat or to cool the stream entering the fractionator and, preferably, is a cooler.

Referring now to Figure 5, a gas stream containing ethylene is passed by way of conduit 60 into absorber 61. In absorber 61 the gas stream is contacted with a suitable solvent, in this instance isooctane, which removes from the gas stream substantially all of its contained ethylene together with a minor proportion of other gases. The solvent is introduced through conduit 62. Residue gas leaves absorber 61 by way of conduit 63 and solvent containing absorbed ethylene and other gases is withdrawn from absorber 61 by way of conduit 64 pumped to a higher pressure than that prevailing in polymerization reactors, to be described, by means of pump 65 and passed by way of conduit 66 into conduits 67 and 68. The portion of solvent containing ethylene and other gases which is passing through conduit 67 enters polymerization reactor 69 and is therein subjected to polymerization conditions. This reactor can be a reactor in which substantially all or only a portion of the ethylene is polymerized. Generally, the conditions for this reactor will be selected so that a substantial proportion of the gases contained in the isooctane are polymerized. Conditions already described herein are suitable for zone 69. From zone 69 the solvent, containing polymer, is passed by way of conduit 70 into polymerization reactor 71. Polymerization reactor 71 can be operated under conditions prevailing in reactor 69 and is preferably so operated. The stream passing through conduit 68 is passed into stripper 72 provided with heating coils 73 and therein heated to cause liberation of a substantial proportion of its contained ethylene which is taken overhead through conduit 74 and conduit 75 and passed into conduit 70 wherein it dissolves in the solvent and polymer phase passing from reactor 69 to reactor 71. From reactor 71 there is obtained a solvent and polymer mixture which is treated to recover solvent for reuse in the system and polymer as product. In order to maintain the desired concentration of ethylene in line 67, it may be desirable to add either solvent from line 76 or ethylene from line 75. To this end, cross-over conduits 77 and 78 are provided, equipped with suitable valves and/or pumps, if necessary, not shown.

It will be noted that in Figure 5 only one pump is employed. The operation of Figure 5 is highly advantageous because it yields a stream of high pressure ethylene for introduction at a plurality of points downstream of the first reactor, or into a plurality of points along the line of flow through the first reactor, to replenish the ethylene as it is converted, without recourse to additional compressors. Of course, when absorber 61 is operated at a pressure which is in excess of that of the polymerization reactors by an amount sufficient to cause proper flow, pump 65 is not necessary. In some instances, it may be desirable to use a pump in line 68 if the pressure drop in stripper 72 is not less than the pressure drop in reactor 69. In any event, one skilled in this art can modify the valving and piping, somewhat, without departing from the essential concept of the claimed invention.

The embodiment of the feature of the invention just described provides a stream of high pressure ethylene by a method which requires a reduced amount of vapor phase compression. It has been found that the efficiency of an ethylene polymerization process can be improved by the addition of ethylene to one or more points in the ethylene reactor. This embodiment renders the overall process of the present invention more flexible because, as described, the operation of the stripper provides means for directly controlling the ethylene content of the reactor feed.

The optimum conditions to be employed in the various steps of the described embodiments can be readily determined and are within the skill of one skilled in the art in possession of this disclosure. Catalysts which can be employed in the polymerization of propylene are well known in the art.

The following is a tabulation of a representative materials balance of a specific operation according to one embodiment of the invention in which an ethane feed containing 95 percent ethane and as the remainder methane and some propane is cracked at a temperature (furnace effluent) of 1500° F. and at a pressure (furnace effluent) of about 5 p. s. i. g. to produce the feed shown. The gases after passing through a knock-out drum, not shown, are compressed to a pressure of about 50 p. s. i. g. and cooled to about 400° F. and passed over a nickel sulfide, acetylene removal catalyst, relying on the hydrogen in the feed to convert the acetylene to ethylene. The acetylene-free gases are then passed over a phosphoric acid, propylene polymerization catalyst thus converting a substantial proportion of the propylene. The propylene polymerization catalyst in this instance is a phosphoric acid catalyst, and conditions are selected to polymerize a substantial part but not all of the propylene. The gases thus obtained are contacted with mineral seal oil to absorb from them the propylene polymer thus formed. The resulting gases are compressed to about 300 p. s. i. g., cooled to about 0° F. and then contacted with isooctane to absorb substantially all of the ethylene therefrom into the isooctane. The solution of ethylene in isooctane thus obtained is then pumped, together with additional isooctane being recycled from an earlier conversion step, into a zone containing a chromium oxide ethylene polymerization catalyst, as described herein, and in Serial No. 333,576, filed January 27, 1953, above mentioned, and therein subjected to solid polyethylene-forming conditions at a temperature of about 300° F. and a pressure of about 400 p. s. i. g. The polymer thus formed contains some propylene which is polymerized with the ethylene. Effluent from the polymerization zone is then heated to about 380° F. and flashed at a pressure of about 20 p. s. i. g. to recover as overhead a substantial part of the solvent and unreacted ethylene and as bottoms polymer dissolved in some solvent. The bottoms are treated to remove therefrom the remaining solvent thus obtaining the desired polymer. In the polymerization of ethylene in the presence of some propylene, some propylene dimer is formed and can be recovered from the flashed overhead, as herein described. The operation here exemplified is substantially that of Figure 3 hereof. The operational steps and the equipment required are, therefore, to be understood to be embodied in this exemplification.

| | $H_2$ | $CH_4$ | $C_2H_2$ | $C_2H_4$ | $C_2H_6$ | $C_3H_6$ | $C_3H_8$ | Propylene Dimer | Propylene Trimer | Polypropylene | Polymer 23 | Isooctane | Mineral Seal Oil | Total |
|---|---|---|---|---|---|---|---|---|---|---|---|---|---|---|
| Cracking Furnace Effluent | 276 | 444 | 46 | 3,795 | 3,773 | 160 | 44 | | | | | | | 8,538 |
| Deacetylizer Effluent | 272 | 444 | | 3,844 | 3,773 | 160 | 44 | | | | | | | 3,837 |
| Propylene Polymerization Zone Effluent | 272 | 444 | | 3,844 | 3,773 | 42 | 44 | | | | 118 | | | 3,837 |
| Polymer Absorber Oil | | | | | | | | | | | | | 10,770 | 10,770 |
| Polymer Absorber Bottoms | | | | 5 | 6 | 9 | 10 | | | | 118 | | 10,770 | 10,913 |
| Polymer Absorber Overhead Product | 272 | 444 | | 3,839 | 3,767 | 33 | 34 | | | | | | | 8,389 |
| Ethylene Absorber Oil | | | | | | | | | | | | | 24,520 | 24,520 |
| Ethylene Absorber Bottoms | | | | 3,724 | 3,754 | 32 | 34 | | | | | | 24,520 | 32,064 |
| Ethylene Absorber Overhead Product | 272 | 444 | | 115 | 13 | 0.4 | | | | | | | | 844 |
| By-passed Polymerization Diluent | | | | | | | | | | | | | 161,480 | 161,480 |
| Ethylene Polymerization Zone Feed | | | | 3,724 | 3,754 | 32 | 34 | | | | | | 186,000 | 193,544 |
| Ethylene Polymerization Zone Effluent | | | | 185 | 3,754 | | 34 | 1 | 2 | | 3,568 | | 186,000 | 193,544 |
| Flash Chamber Overhead Product | | | | 185 | 3,754 | | 34 | 1 | 2 | | | | 182,100 | 186,176 |
| Flash Chamber Bottoms | | | | | | | | | 2 | | 3,568 | | 3,900 | 7,468 |
| Polymer Column Bottoms | | | | | | | | | | | | | | 1 |
| Recycle Column Bottoms | | | | | | | | | | | | | 182,099 | 182,099 |
| Recycle Column Liquid Overhead Product | | | | | | | | 1 | | | | | | 1 |
| Purge Gas | | | | 185 | 3,754 | | 34 | | | | | | | 3,973 |
| Make-up Polymerization Diluent | | | | | | | | | | | | | 3,901 | 3,901 |

NOTE.—
All quantities in pounds.
Cracking furnace feed: Ethane 8,538 pounds.
Ethylene conversion in polymerization zone: 95 percent.
All ethylene polymerization off-gas is purged.
More isooctane is required in polymerization zone than is required in ethylene absorber.
The additional isooctane is introduced between the absorber and reactor.

It is noted, especially, that the absorber liquid-diluent of the present invention is inert and, therefore, it can be reused indefinitely; further that because the same liquid is employed in both the absorber and in the polymerization steps it performs a multiple of services lending considerable economy to the operation.

The products of this invention are either tacky, semi-solid, or solid polymers of ethylene.

While the operations of the specific embodiments of the invention are preferred to be conducted with conditions to maintain substantially liquid phase in the ethylene polymerization zone, partial vapor phase operation is possible even to the extent that substantially all of the ethylene is in the vapor phase while at least a portion of the solvent is in the liquid phase.

The pressure must be high enough to maintain the diluent in the liquid phase and to assure that olefins not liquefied under these conditions are dissolved in the liquid phase in sufficient amount.

The reaction may be carried out in a fixed-bed or a moving-bed catalyst chamber. The reaction may also be effected in a catalyst slurry with the reaction product taken off for purification and the catalyst to be regenerated taken off as a slurry, washed to remove occluded hydrocarbons, and passed on to regeneration. The regeneration is accomplished by oxidizing the residual coke and heavy polymer deposit with a controlled concentration of oxygen in an inert gas by conventional procedures. Suspended catalyst techniques can also be employed.

It will be understood that the embodiments herein described are inclusive of the requisite pumps, compressors, heaters, coolers, valves and other equipment which ordinarily will be employed in the routine execution of the invention. Also, details and steps of operation, for example, temperature regulation or the establishment of conditions optimum for each step of the claimed invention, are included within the scope of the appended claims.

In the claims, it will be understood that the word "solid" applies also to include semi-solid and/or tacky products which not being liquids at ordinary temperatures are defined as solids. It is products such as these to which the terminology "high molecular weight polymer" is intended to be applied.

Reasonable variation and modification are possible within the scope of the foregoing disclosure, drawings, and the appended claims to the invention, the essence of which is that there have been provided, as described, a combination of steps of absorption of ethylene from gases containing the same and subjecting the combined mixture of absorption medium and ethylene contained therein to polymerization conditions, in the presence of a catalyst, adapted to form a polyethylene, as described; a combination of steps in which, when propylene and other gases in undesirable amounts are contained in the absorption medium after contact with said gases, the mixture of absorption medium and gases in it is first subjected to a polymerization or other conversion operation, or operations, to remove therefrom any undesirable amounts of gases present therein, for example, to remove acetylene and/or undesirable amounts of propylene; and a combination for feeding step-wise to a plurality of points within a system, through which is passing a solvent containing a vaporous material, the concentration of which material in said solvent is reduced by its conversion in said system, which comprises absorbing said material in said solvent, dividing the solution thus obtained into at least two portions, feeding at least one portion to a point in said system, converting said material in said solvent, passing said solvent to another point in said system, passing at least one portion of said solution to a stripper in which it is made to yield up a substantial portion of said vaporous material, passing said vaporous material obtained from said stripper to said another point in said system together with the solvent being passed to said point and at said point converting said vaporous material, obtained from said stripper, dissolved in said solvent.

I claim:

1. A process for producing a solid polymer of ethylene and a liquid polymer of an olefin having a molecular weight higher than ethylene which comprises contacting an olefin feed material comprising ethylene and an olefin of higher molecular weight and lighter materials with a liquid hydrocarbon absorbent which is inert and non-deleterious under hereinafter described polymerization conditions whereby the ethylene and olefins of higher molecular weight are absorbed and freed from the lighter materials and passing the olefin feed mixture through a polymerization zone in which the predominant reaction is polymerization of ethylene to solid polymer and a polymerization zone in which the predominant reaction is polymerization of said olefin having a molecular weight higher than ethylene olefin feed mixture being introduced sequentially from one of said zones to the other of said zones.

2. A combination process for the production of a polymer of propylene and a normally solid polymer of ethylene which process comprises the following steps in combination: passing a gas stream comprising ethylene and propylene together with lighter materials including hydrogen into a first polymerization zone containing a polymerization catalyst and maintained under conditions suitable for the selective polymerization of propylene, therein effecting polymerization of propylene to normally liquid polymers without substantial polymerization of ethylene; passing a hydrocarbon effluent from said first polymerization zone to a first absorption zone, contacting the hydrocarbon effluent with a normally liquid hydrocarbon oil under absorption conditions such that normally liquid polymer of propylene is selectively absorbed in said oil; removing an enriched oil from said first absorption zone and recovering propylene polymer therefrom; passing a gaseous effluent from said first absorption zone to a second absorption zone and therein contacting said effluent with a hydrocarbon solvent which is liquid under the absorption conditions and liquid and inert under polymerization conditions subsequently described, thereby absorbing ethylene in said solvent; removing materials lighter than ethylene from the system; withdrawing an ethylene-enriched solvent from said second absorption zone and passing the enriched solvent to a second polymerization zone wherein said enriched solvent is contacted with a composite chromium oxide catalyst at a temperature in the range 225 to 350° F. and a pressure sufficient to maintain said solvent substantially in the liquid phase; withdrawing an effluent from said second polymerization zone; and recovering a normally solid polymer from said effluent.

3. A process which comprises introducing a normally gaseous mixture comprising ethylene and propylene together with lighter gases into an absorption zone and therein contacting said mixture with a liquid hydrocarbon which is inert and liquid under polymerization conditions subsequently described herein; absorbing ethylene and propylene in said hydrocarbon; withdrawing material lighter than ethylene from the system; passing enriched hydrocarbon solvent from said absorption zone to a first polymerization zone containing a catalyst which catalyzes the polymerization of propylene but does not substantially catalyze the polymerization of ethylene, said polymerization zone being maintained under temperature and pressure conditions suitable for the polymerization of propylene to liquid polymer; effecting the polymerization of propylene without substantial polymerization of ethylene; passing a resulting effluent from said first polymerization zone to a second polymerization zone maintained at a temperature in the range 225 to 350° F. and a pressure sufficient to maintain said effluent substantially in the liquid phase; contacting said effluent with a catalyst comprising chromium oxide in said second polymerization zone; fractionating a hydrocarbon mixture effluent from said second polymerization zone and recovering therefrom a normally solid polymer, at least one normally liquid polymer of propylene, and said solvent.

4. A process which comprises supplying a normally gaseous stream comprising ethylene and propylene together with other gaseous hydrocarbons and hydrogen to a first catalytic polymerization zone; effecting polymerization of part of said propylene to liquid polymer in said first polymerization zone without substantial polymerization of said ethylene; passing a resulting hydrocarbon mixture to a first absorption zone and therein contacting said mixture with a hydrocarbon absorption oil, thereby absorbing propylene polymer in said oil; withdrawing enriched oil from said first absorption zone and recovering propylene polymer therefrom; passing a gaseous mixture containing ethylene and unpolymerized propylene from said first absorption zone to a second absorption zone and therein absorbing ethylene and unpolymerized propylene in a liquid hydrocarbon solvent which is liquid and inert under polymerization conditions subsequently described; passing enriched solvent from said second absorption zone to a second polymerization zone maintained at a temperature in the range of 225 to 350° F. and a pressure sufficient to maintain said solvent substantially in the liquid phase; in said second polymerization zone, contacting said enriched solvent with a catalyst comprising chromium oxide, whereby a normally solid copolymer of ethylene and propylene is formed; passing a resulting mixture from said second polymerization zone to a recovery zone and therein recovering said copolymer.

5. A process for the production of a solid polymer which process comprises cracking a hydrocarbon stream to produce a mixture of gases containing hydrogen, methane, acetylene, ethylene, ethane, propane, and propylene; subjecting said mixture to conditions suitable for the removal of acetylene therefrom; subjecting a resulting stream essentially free from acetylene to catalytic polymerization to produce and remove therefrom a liquid propylene polymer; subjecting the remaining gaseous stream to absorption conditions in an absorption zone and therein absorbing ethylene in a hydrocarbon solvent which is liquid and nonpolymerizable; subjecting a resulting mixture of solvent and ethylene to temperature and pressure conditions suitable for the formation of a solid polymer of ethylene, and recovering a solid polymer of ethylene.

6. A process for the production of ethylene polymer and propylene polymer from a cracked gas comprising ethylene and propylene, which process comprises polymerizing at least part of said propylene under conditions suitable for the selective polymerization of said propylene to liquid polymer without substantial polymerization of ethylene, absorbing ethylene in a solvent, subsequently described, to form an ethylene-enriched solvent, passing said ethylene-enriched solvent to a polymerization zone wherein ethylene is polymerized in the presence of a hydrocarbon solvent which is liquid and inert under the polymerization conditions to produce a solid polymer of ethylene and recovering said solid polymer and a liquid propylene polymer.

7. A process according to claim 6 wherein the propylene is polymerized in the presence of a phosphoric acid polymerization catalyst.

8. A process according to claim 1 wherein a cracked gas containing ethylene and propylene is absorbed into said adsorbent, the enriched adsorbent is subjected to propylene polymerization conditions, and the thus treated adsorbent is subjected to ethylene polymerization conditions to produce said polyethylene.

9. A process according to claim 1 wherein the effluent from the ethylene polymerization zone is separated into solvent, which is returned to the absorption step for reuse, a $C_{12}$ polymer, propylene dimer, unreacted gases and a solid polyethylene.

10. A process for the production of a solid polymer which comprises cracking a hydrocarbon stream to produce a stream of gases containing hydrogen, methane, acetylene, ethylene, ethane, propane, and propylene, subjecting said gaseous stream to conditions suitable for the removal of acetylene therefrom, then subjecting said stream to catalytic polymerization to produce and remove therefrom, as a product of the process, a liquid propylene polymer, then subjecting the remainder of said stream to ethylene-absorbing conditions to absorb ethylene into a nonreactive solvent which remains nonreactive under conditions suitable for the polymerization of ethylene to a solid polyethylene, then subjecting said thus-absorbed ethylene to solid polyethylene-forming conditions in the presence of a chromium oxide polymerization catalyst containing hexavalent chromium, and then recovering solid polyethylene from said solvent.

11. A process for the production of solid polymer according to claim 10 wherein the ethylene and solvent mixture is divided into at least two streams, a first stream is passed to at least one of several polymerization zones, maintained under polymerization conditions suitable for the production of said polyethylene, another stream which is passed to a stripper and therein caused to yield up a substantial portion of its dissolved ethylene, and wherein thus recovered ethylene is passed to at least one other of said zones maintained under said last-mentioned conditions.

12. A process according to claim 11 wherein the solvent is passed from the first mentioned polymerization zone to the second mentioned polymerization zone and the ethylene passed to said second mentioned polymerization zone is admixed with said solvent passed to said second mentioned polymerization zone before said solvent has substantially entered said zone.

13. A process according to claim 11 wherein the solvent containing ethylene obtained from the ethylene absorbing step is pumped to a pressure substantially above that of said polymerization zones, is divided into said at least two streams and wherein the stream passed to said stripper is heated to yield up a portion of its ethylene thus obtaining ethylene at a high pressure sufficient to feed the same to said zones.

14. In a method of feeding to a plurality of polymerization conversion zones in a system a vaporous material comprising ethylene under a pressure sufficient to accomplish said feeding at a plurality of points in the system, in which a solvent is employed to absorb said material and convey it through each of said zones, the steps comprising, feeding said material to an absorber zone, therein contacting said material under absorbing conditions with said solvent to form a solution of said material in said solvent at a pressure sufficient to accomplish said feeding at a plurality of points in the system, removing said solution from said absorber zone, dividing said solution into at least two portions, feeding at least one of said portions of said polmerization solution to at least one of said conversion zones, wherein the vaporous material is converted and wherein the solvent remains substantially unaffected, passing said solvent to another polymerization conversion zone, passing at least another portion of said solution, obtained from said absorber zone, to a stripper zone wherein said solution is made to yield up a substantial quantity of said vaporous material, and passing said vaporous material to said solvent being passed to said another polymerization conversion zone, in said another polymerization conversion zone converting said vaporous material and leaving said solvent substantially unaffected, and finally, recovering solvent and converted material from said last mentioned polymerization zone.

15. A method according to claim 14 wherein solvent from the stripper zone is returned to the absorber zone for absorbing additional quantities of said vaporous material and wherein a solvent recovered from said last mentioned conversion zone is also returned to the system for reuse.

References Cited in the file of this patent
UNITED STATES PATENTS
2,691,647  Field _____ Oct. 12, 1954

UNITED STATES PATENT OFFICE
CERTIFICATE OF CORRECTION

Patent No. 2,827,444

March 18, 1958

Martin R. Cines

It is hereby certified that error appears in the printed specification of the above numbered patent requiring correction and that the said Letters Patent should read as corrected below.

Column 3, line 45, for "isoocatane" read -- isooctane --; lines 52 and 60, for "isoctane" read -- isooctane --; line 70, for "catalyst 230" read -- catalyst 23 --; column 4, line 9, for "isoctane" read -- isooctane --; line 58, for "miner" read -- mineral --; column 9, line 62, after "ethylene" insert a comma; column 11, line 40, for the claim reference numeral "1", read -- 6 --; column 12, line 38, after "said" strike out "polymerization" and insert the same after "said" and before "conversion" in line 39, same column.

Signed and sealed this 29th day of July 1958.

(SEAL)

Attest:

KARL H. AXLINE

Attesting Officer

ROBERT C. WATSON
Commissioner of Patents